United States Patent [19]
Bonnet

[11] Patent Number: 5,439,098
[45] Date of Patent: Aug. 8, 1995

[54] POWERED BELT TURN

[75] Inventor: Henri Bonnet, Atlanta, Ga.

[73] Assignee: United Parcel Service of America, Inc., Atlanta, Ga.

[21] Appl. No.: 176,772

[22] Filed: Jan. 3, 1994

[51] Int. Cl.⁶ ............................................. B65G 47/80
[52] U.S. Cl. .................................................. 198/831
[58] Field of Search ................... 198/803.16, 804, 831, 198/839

[56] References Cited

U.S. PATENT DOCUMENTS

| | | |
|---|---|---|
| 1,254,941 | 1/1918 | Snow . |
| 1,698,786 | 1/1929 | Finn . |
| 1,823,483 | 9/1931 | Bausman ............... 198/831 |
| 2,253,913 | 8/1941 | Paterson ................ 198/182 |
| 3,027,852 | 4/1962 | Key ......................... 107/8 |
| 3,044,603 | 7/1962 | Fry .......................... 198/182 |
| 3,153,475 | 10/1964 | Swanson ................. 198/182 |
| 3,358,811 | 12/1967 | Gerrish ................... 198/182 |
| 3,951,256 | 4/1976 | Gurewitz ................ 198/182 |
| 4,180,158 | 12/1979 | Frederick ............... 198/831 |

FOREIGN PATENT DOCUMENTS

| | | | |
|---|---|---|---|
| 2447878 | 10/1980 | France ................... 198/831 |
| 2611354 | 9/1977 | Germany ................ 198/831 |
| 0140411 | 6/1986 | Japan ................. 198/803.16 |
| 0145027 | 7/1986 | Japan ................. 198/803.16 |
| 0575082 | 10/1977 | U.S.S.R. ................ 198/831 |
| 0589958 | 1/1978 | U.S.S.R. ................ 198/831 |

Primary Examiner—Joseph E. Valenza
Attorney, Agent, or Firm—Jones & Askew

[57] ABSTRACT

A powered belt turn (10) for conveying parcels, objects and the like around curves. The powered belt turn (10) is embodied in a disk-shaped transfer sheet (20) that is rigidly attached to a shaft (30). A motor (60) is operatively attached to shaft (30), causing the shaft and transfer sheet (20) to rotate in unison. The transfer sheet rests on a bed (70) that is positioned between a feed conveyor belt and an exit conveyor belt. Parcels move onto the transfer sheet from the feed conveyor belt. The spinning transfer sheet (20) delivers the parcels from the feed conveyor belt to the exit conveyor belt. The parcels exit the transfer sheet (20) onto the exit conveyor belt (50). The transfer sheet is bent downwardly and the feed and exit conveyor belts are placed adjacent the bent portion of the transfer sheet (20) to deposit parcels onto the transfer sheet and receive parcels from the transfer sheet, respectively. Alternatively, the feed conveyor belt may be positioned above the transfer sheet.

9 Claims, 5 Drawing Sheets

Fig_1A

Fig_1B

Fig. 1C

POWERED BELT TURN

TECHNICAL FIELD

The present invention relates to conveyor belts for transporting objects, and more specifically to a powered belt turn for conveying objects from a conveyor belt oriented in a first direction to a conveyor belt oriented in a second direction.

BACKGROUND OF THE INVENTION

Conveyor belts have long been known as effective means for transporting parcels, articles or objects. A conveyor belt can be used to move objects, such as parcels or parts, through a sorting facility, a manufacturing plant or an assembly plant.

Often, a conveyor belt must transport articles around a curve. For example, it is not uncommon for two straight runs of a conveyor belt to sit adjacent one another or to be perpendicularly oriented to form a ninety degree (90°) angle. A curved section of the conveyor belt must transport articles from the end of the first conveyor belt to the start of the second conveyor belt.

There are numerous patents relating to powered belt turns in conveyor belt systems. For example, in U.S. Pat. No. 3,951,256, issued to Gurewitz, an endless, arcuate shaped conveyor belt carries articles around curves in a conveyor belt system. The arcuate conveyor belt is hung between two rollers. A motor powers one of the rollers, which roller causes the arcuate belt to rotate. One of the two rollers is positioned adjacent the feed conveyor belt and the other roller is positioned adjacent the exit conveyor belt. A bed supports the arcuate conveyor belt. Rotation of the arcuate conveyor belt carries objects between the feed conveyor belt and exit conveyor belt. Guides on the rollers keep the arcuate conveyor belt on-line on the bed and rollers.

Another powered belt turn is set forth in U.S. Pat. No. 3,153,475, issued to Swanson. In Swanson, a ring-shaped conveyor belt is mounted on rollers. The conveyor belt is folded in half and the rollers are positioned within the belt along the folded radius of the ring-shaped conveyor belt (FIG. 1). Each roller has a gear mechanism that extends into the opening in the center of the ting-shaped conveyor belt. A central shalt with gears engages both rollers, thereby causing both rollers to turn. The rotational movement of the rollers causes the conveyor belt to rotate, thereby transferring objects on the upper surface of the conveyor belt around a one hundred and eighty degree (180°)turn.

The provision of powered belt turns such as those discussed above require positioning and maintaining the conveyor belt on end rollers. For example, guide chains mounted on one or both sides of the conveyor belt, or flanges and corresponding apertures on the rollers and conveyor belt, must be present in the powered belt turn to keep the conveyor belt in position around the curved path. These guide devices are complicated, expensive and have been found to wear rapidly, requiring frequent adjustment or part replacement.

Therefore, it would be desirable to have a powered belt turn that requires no guide means or means for keeping the curved conveyor belt on an arcuate path.

Furthermore, there is a need for a curved conveyor belt that can be operated at very high speeds without fear of the conveyor belt being disconnected from the guide means or the drive means.

SUMMARY OF THE INVENTION

That the present invention accomplishes these objects and overcomes the above cited drawbacks of the prior art will be apparent to those skilled in the art from the detailed description of the preferred embodiment to follow. The present invention is a powered conveyor belt turn that is operable at very high speeds and does not require a belt guide.

Generally described, the present invention is a powered belt turn positioned to transfer parcels between a feed conveyor and an exit conveyor. The powered belt turn comprises a transfer sheet resting on a bed defining a horizontal surface, and further including a rotatable shaft fixed to the transfer sheet. The transfer sheet rotates over the bed in correspondence with the rotation of the shaft. The feed conveyor deposits parcels onto the transfer sheet. Rotation of the transfer sheet carries parcels from the feed conveyor to the exit conveyor.

More specifically described, the powered belt turn of the present invention is comprised of a disk-shaped, semi-rigid transfer sheet that is rigidly attached to the end of a shaft. The shaft is rotated by a motor. Rotation of the shaft causes the transfer sheet to rotate. The transfer sheet rests on a horizontal bed that is positioned between the feed conveyor belt and the exit conveyor belt. The transfer sheet is supported underneath by rollers or casters, or a friction bed. A portion of the disk-shaped transfer sheet is bent downwardly over a straight edge of the bed. In the preferred embodiment, at this straight edge the transfer sheet meets both the upstream feed conveyor and the downstream exit conveyor.

In operation, the parcels move onto the transfer sheet by means of the feed conveyor belt. The parcels are deposited by the feed conveyor belt onto the spinning transfer sheet at the point where the spinning transfer sheet rises over the edge of the bed. Rotation of the transfer sheet delivers objects from the feed conveyor belt to the exit conveyor belt. The exit conveyor is installed where the transfer sheet is bent downwardly over the straight edge of the bed. The parcels exit the transfer sheet and are carried on the exit conveyor belt, while the portion of the transfer sheet that has been carrying the parcels moves downwardly over the straight edge of the bed and around the vertical portion of the path, until the disk material rises again and makes its way onto the bed.

In one embodiment of the present invention, the feed conveyor belt and exit conveyor belt are positioned adjacent the linear edge of the transfer sheet to deliver objects around a one hundred and eighty degree (180°) turn. Alternatively, the feed conveyor belt can be positioned above the horizontal bed which supports the transfer sheet. For a ninety degree (90°) turn, for example, the feed conveyor belt can be positioned above the transfer sheet perpendicular to the exit conveyor belt. Parcels are dropped from the feed conveyor onto the transfer sheet. The rotation of the transfer sheet will carry objects around to the exit conveyor belt which is positioned adjacent the linear edge where the transfer sheet is bent over the bed.

In an alternative embodiment of the present invention, the disk-shaped transfer sheet is folded in half. The upper segment of the disk-shaped transfer sheet rests on a first bed and the transfer sheet is folded over a linear edge of the first bed. The lower segment of the disk-shaped transfer sheet rests on a second bed that is positioned below the first bed. A horizontally oriented shaft extends through a vertically oriented center portion of the transfer sheet and between the first and second beds. The shaft is rigidly attached to the transfer sheet and rotation of the shaft causes rotation of the transfer sheet. If the belt turn is one hundred and eighty degrees (180°), the feed conveyor belt and the exit conveyor belt are positioned adjacent the linear edge of the first bed, as was set forth above. Rotation of the transfer sheet across the first bed transfers objects from the feed conveyor belt to the exit conveyor belt.

In a second alternative embodiment of the present invention, the transfer sheet is frustoconically-shaped. A horizontally oriented shaft extends through the frustoconically-shaped transfer sheet. The shaft is rigidly affixed to the transfer sheet. The upper segment of the frustoconically-shaped transfer sheet rests upon a bed. Two idler rollers are positioned on opposing ends of the bed. The rollers allow the frustoconically-shaped transfer sheet to rotate across the surface of the bed in unison with the rotating shaft. A feed conveyor belt is positioned adjacent one of the rollers and an exit conveyor belt is positioned adjacent the second roller. Rotation of the frustoconically-shaped transfer sheet carries objects from the feed conveyor belt to the exit conveyor belt.

Affixing the shaft directly to the transfer sheet eliminates the need for guide devices to maintain the position of the transfer sheet on the bed. The transfer sheet will automatically remain in place due to its semi-rigid nature and the fact that it is fixed securely to the shaft. Therefore, the powered belt turn of the present invention can operate at higher speeds than conventional belt turns and without the need for a guide means.

The present invention also provides a powered belt turn that eliminates the need for a drive means between the transfer sheet and drive shaft. In the present invention, the drive shaft is affixed directly to the transfer sheet, and no drive rollers, gear and sprocket mechanisms or other driving mechanisms are required.

Therefore, it is an object of the present invention to provide a powered belt turn which can be operated at high speeds.

It is another object of the present invention to provide a powered belt turn which does not include a guide means for keeping the transfer sheet in position on a bed.

It is another object of the present invention to provide a powered belt turn which does not include drive rollers, gear and sprocket mechanisms, or an equivalent driving mechanism, for driving the transfer sheet.

DETAILED DESCRIPTION OF DRAWINGS

Figure 1A:
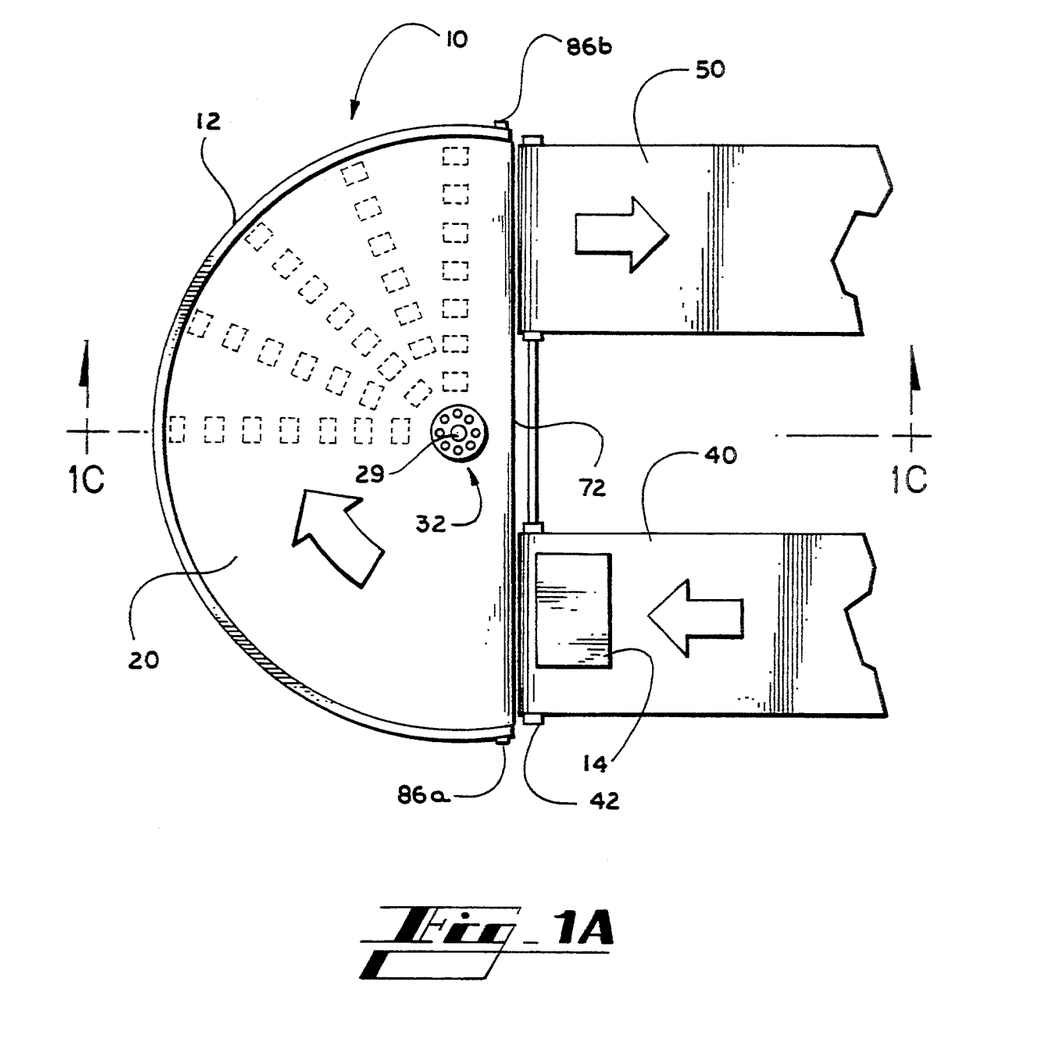
FIG. 1A is a top view of the preferred embodiment of the powered belt turn of the present invention.

Turning next to the figures in which like numerals indicate like parts, the preferred embodiment of the present invention will now be described. FIG. 1A is a top view of the powered belt turn 10 in the preferred embodiment of the present invention. The powered belt turn 10 includes a transfer sheet 20 that is disk-shaped in the preferred embodiment of the present invention. A feed conveyor belt 40 provides parcels 14 to the powered belt turn 10, and an exit conveyor belt 50 carries parcels 14 from the powered belt turn 10.

The powered belt turn 10 includes the disk-shaped conveyor belt or transfer sheet 20. In the preferred embodiment of the present invention, the transfer sheet 20 is a disk-shaped piece of semi-rigid material. The transfer sheet 20 is preferably made of Kevlar ® woven into a sheet of polyester. Those skilled in the art will recognize that the transfer sheet 20 may be a different shape or could be manufactured using semi-rigid materials other than those listed herein. As described below in relation to the preferred embodiment of the invention, at any given time the sheet 20 has a horizontal segment 22 and a vertical segment 24.

Figure 1B:
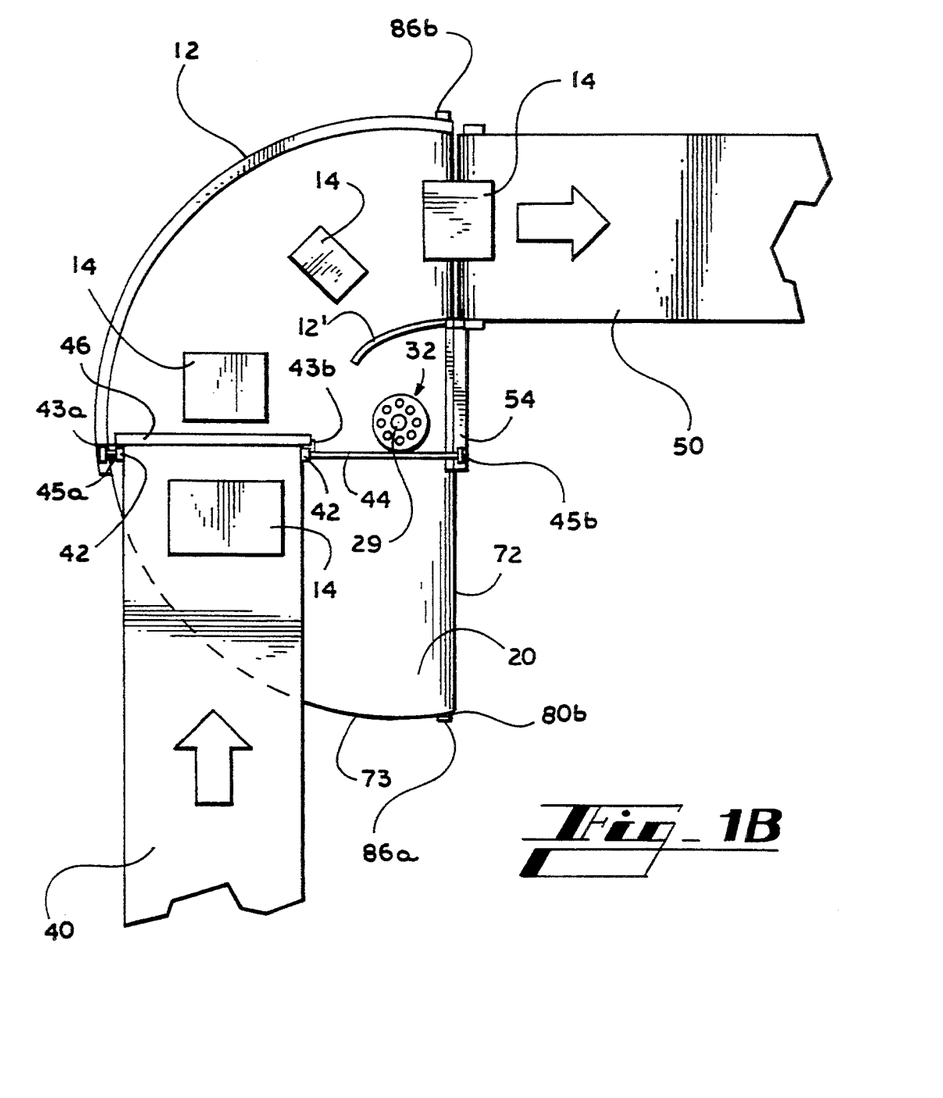
FIG. 1B is a top view of the mechanism of FIG. 1A with the feed conveyor belt and exit conveyor belt positioned to form a ninety degree (90°) powered belt turn.
Figure 1C:
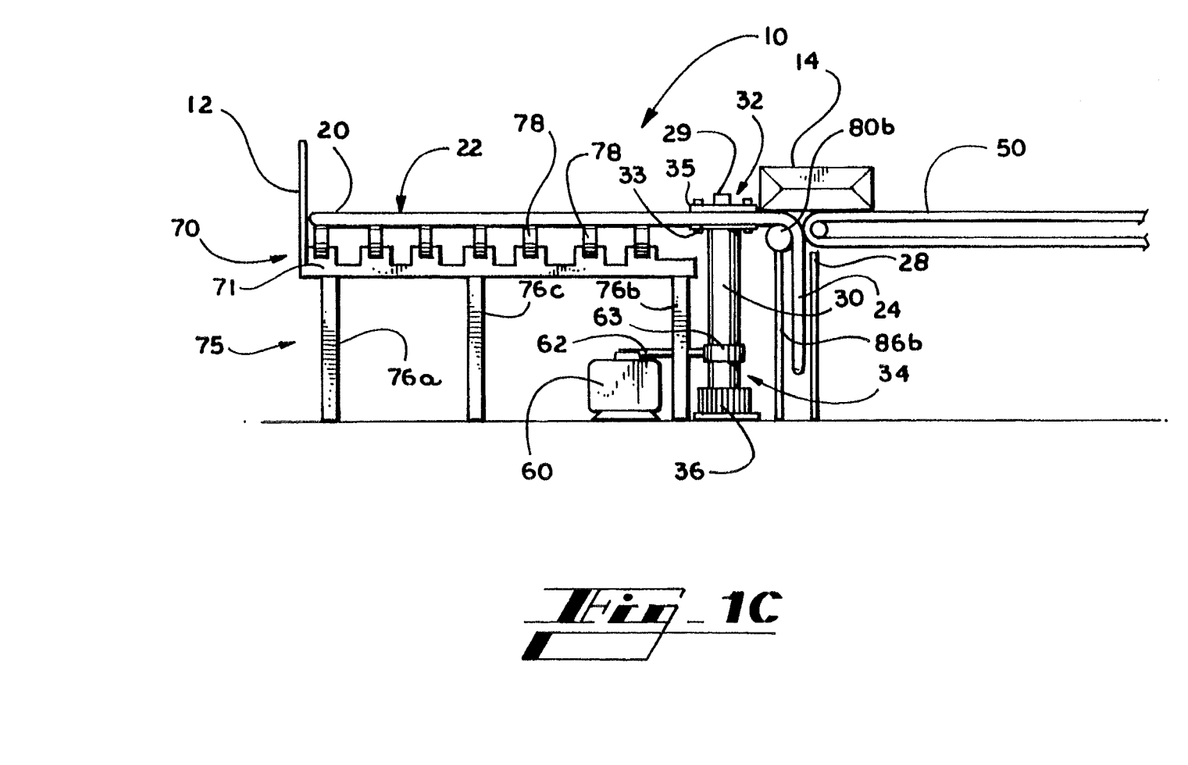
FIG. 1C is a cross-sectional side view of the powered belt turn taken along line 1C—1C of FIG. 1A.

Referring to FIG. 1C, which is a cross-sectional side view of the powered belt turn 10 of FIG. 1A taken along line 1C—1C, a vertically oriented shaft 30 has a pin 29 that extends through transfer sheet 20. The shaft 30 is bolted to the transfer sheet 20 at one end 32, and extends downwardly below the sheet 20 to a second end 34, which is journaled inn a bearing 36. Flange 33 (FIG. 1C) is integrally formed onto end 32 of shaft 30. A second flange 35 fits around pin 29 and is clamped and bolted onto transfer sheet 20. The flange 35 is bolted to the flange 33 and clamps the sheet 30 in position relative to the shaft 30. As will be familiar to those skilled in the art, the second end 34 of shaft 30 is fixed in position by bearing 36 which forms a cup around the second end 34 of shaft 30 to permit rotation of the shaft 30.

Continuing with FIG. 1C, the transfer sheet 20 is supported on a bed 70. The bed 70 is comprised of a plurality of rollers or casters 78 rotatably mounted on a support plate 71. The rollers 78 support the horizontal segment 22 of the transfer sheet 20 while enabling the transfer sheet 20 to move over the bed 70. The rollers 78 are arranged along the radii extending outwardly from the shaft 30 to form arcuate rows as shown in phantom in FIG. 1A. Those skilled in the art will recognize that the number, size and spacing of rollers 78 may be varied in different systems. Furthermore, the rollers 78 may be powered to assist movement of the sheet 20 and reduce stress on the point where the shaft 30 is attached to the sheet 20. In an alternative embodiment of the present invention, the bed 70 may not include the rollers 78. In such an embodiment, the upper surface of the support plate 71 would be flat, and preferably coated with a low friction material such as Teflon ®, and the transfer sheet 20 would slide over the support plate 71.

The support plate 71 of the bed 70 is supported by frame 75, that includes vertical members 76a, b and c (FIG. 1C). Those skilled in the art will recognize that the number and position of the vertical members may be varied. Furthermore, the function of supporting the bed 70 may be performed by a variety of differently structured frames.

The bed 70 is shaped to form a segment of a circle extending around the shaft 30 (FIGS. 1B and C) and coextensively with the horizontal segment 22 of transfer sheet 20. The horizontal segment 22 of sheet 20 is bounded by a chord 72 and an arc 73 (FIG. 1B). Referring back to FIG. 1C, the vertical segment 24 of the transfer sheet 20 is bent downwardly at the chord 72 over the linear edge of the bed 70.

A pair of rollers 80a and b (FIGS. 1B and C) are positioned at the point where the sheet 20 is bent downwardly. The rollers 80a and b facilitate movement of the belt 20 over the linear edge of the bed 70. The rollers 80a and b are more fully described in conjunction with FIG. 2A, below. The rollers 80a and b are supported by the members 86a and b. The members 86a and b extend upwardly from the ground to support the rollers 80a and b in a manner more fully described below, in conjunction with FIGS. 2A and B.

A motor 60 rotates the shaft 30. The motor 60 is an electric motor familiar to those skilled in the art. A chain 62 extends between a sprocket (not shown) on the shaft of the motor 60 and a sprocket 63 on the shaft 30. The chain 62 is rotated by motor 60, causing the shaft 30 to rotate. Those skilled in the art will recognize other means for causing rotation of the transfer sheet 20 via rotation of the shaft 30, such as using different motors or different coupling mechanisms between the motor 60 and the shaft 30. Furthermore, a speed control and reducer mechanism familiar to those skilled in the art, such as the speed control mechanism 64 shown in FIG. 2B, could be interpositioned between the motor 60 and shaft 30 to control the speed of rotation of the shaft 30.

The shaft 30 and the transfer sheet 20 rotate in unison. Referring to FIG. 1C, when the transfer sheet 20 rotates, the horizontal segment 22 of the transfer sheet 20 passes over chord 72 and is bent downwardly to become the vertical segment 24 of the transfer sheet 20. A guide plate 28 is secured to the ground and extends upward adjacent the vertical segment 24 of the transfer sheet 20. The guide plate 28 forces the transfer sheet 20 downward when transitioning between a horizontal and a vertical orientation over chord 72. The guide plate 28 is a metal plate in the preferred embodiment. The guide plate 28 may be a bar or roller in an alternative embodiment of the present invention.

The feed conveyor belt 40 is positionable at a variety of locations relative to the powered belt turn 10. In FIG. 1A, the feed conveyor belt 40 is positioned adjacent the powered belt turn 10 to form a one hundred and eighty degree (180°) turn. The end of the feed conveyor belt 40 adjacent the powered belt turn 10 can be raised slightly above the powered belt turn 10 to ensure that objects or parcels 14 pass smoothly onto the powered belt turn 10.

In FIG. 1B, the feed conveyor belt 40 is positioned above the powered belt turn 10 to form a ninety degree (90°) turn. The feed conveyor belt 40 rotates around a terminal roller 42 that is fixed above the powered belt turn 10 by a support axle 44. The support axle 44 is fixed at one end 45a to an arcuate side panel 12, which extends around a portion of the belt turn 10 and projects above the powered belt turn 10. The support axle 44 is fixed at its second end 45b to a cover 54. The cover 54 is a metal plate affixed to the frame 75 that covers the downwardly rotating transfer sheet 20. The cover 54 is designed to prevent injuries to workers.

The feed conveyor belt 40 rotates with roller 42, providing parcels 14 to the powered belt turn 10 in a manner familiar to those skilled in the art. When the feed conveyor belt 40 is positioned above the powered belt turn 10, a transfer plate 46 extends downwardly at an incline from the end of the feed conveyor belt 40. The transfer plate 46 is a rigid metal plate that is mounted to the support axle 44 by bars 43a and b. The transfer plate 46 supports packages as they pass from the feed conveyor belt 46 to the powered belt turn 10 to prevent dropping. Those skilled in the art will recognize other methods and apparatus for fixing the feed conveyor belt 40 above the powered belt turn 10.

Parcels 14 passing from feed conveyor belt 40 are moved to the exit conveyor belt 50 by the rotation of the transfer sheet 20. The side panel 12 in FIG. 1A extends around the outer circumference of bed 70 to prevent packages from falling off the transfer sheet 20. In the preferred embodiment of the present invention, the side panel 12 is an arcuate metal plate. The side panel 12 is fixed to bed 70, and extends upwardly above the upper surface of sheet 20 about 8–10".

Referring now to FIG. 1B, the side panel 12 is identical to side panel 12 in FIG. 1A, except that it only extends about one-half way around the transfer sheet 20 because the parcels 14 are only carried around a ninety degree (90°) turn. An interior panel 12' is an arcuate metal plate that is affixed to cover 54 and is positioned slightly above transfer sheet 20. The panel 12' extends from the cover 54 partially around shaft 32 toward the feed conveyor 40. The interior panel 12' serves to prevent parcels 14 from falling off the interior of the transfer sheet 20 (FIG. 1B). The panel 12' extends approximately 8–10" above the upper surface of the transfer sheet 20 in the preferred embodiment of the present invention, although the panel 12' could have different heights.

As is shown in FIG. 1C, the parcels 14 pass from the transfer sheet 20 to the exit conveyor belt 50. In the preferred embodiment of the present invention, the space between the transfer sheet 20 and the exit conveyor belt 50 is not large enough to catch or impede parcels 14. However, if desired, a transfer plate (not shown) may be positioned between the transfer sheet 20 and the exit conveyor belt 50 to support parcels 14. Alternatively, the exit conveyor belt 50 may be positioned below the transfer sheet 20 to ensure the transfer of the parcel 14 to the exit conveyor 50. Likewise, the feed conveyor belt 40 may be positioned slightly above the transfer sheet 20 to ensure the transfer of parcels 14 to the transfer sheet 20.

In the preferred embodiment, the feed conveyor belt 40 and the exit conveyor belt 50 are standard linear conveyor belts familiar to those skilled in the art. A chute or powered rollers may be substituted for the feed and/or exit conveyor belts, 40 and 50.

Figure 2A:
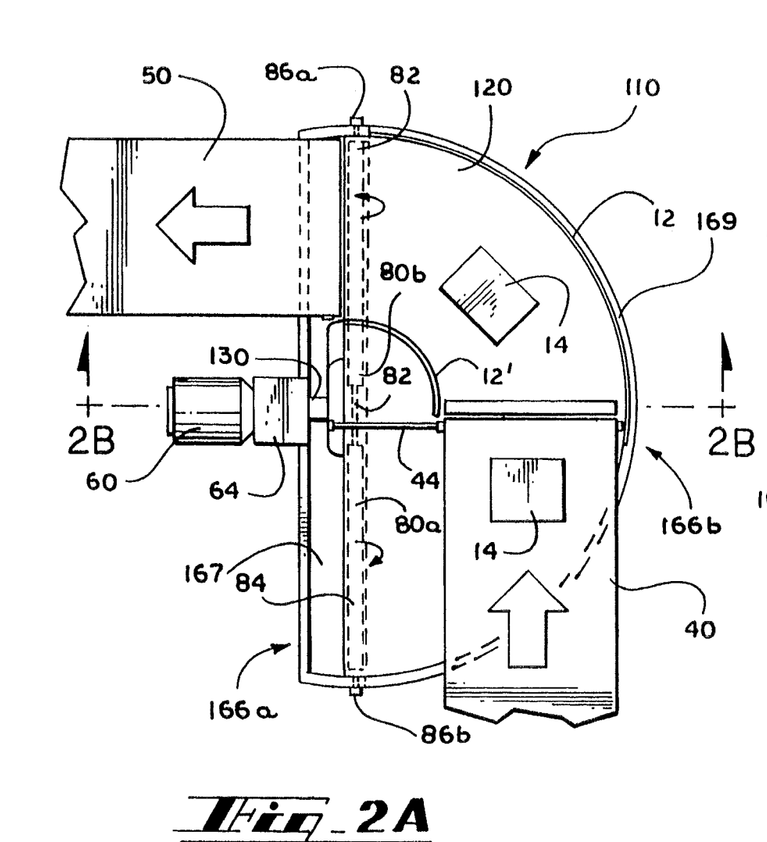
FIG. 2A is a top view of an alternative embodiment of the powered belt turn of the present invention.

FIG. 2A is a top view of an alternative embodiment of a powered belt turn 110 of the present invention. As set forth above in regard to the preferred embodiment of the present invention, the powered belt turn 110 is positioned to receive parcels 14 from the feed conveyor belt 40, and to transfer the parcels 14 to the exit conveyor belt 50. The side panel 12 and the interior side panel 12' retain parcels on a transfer sheet 120 as it rotates. The side panel 12 is identical to the side panel 12 in FIG. 1B. The interior side panel 12' is identical to the interior side panel 12' in FIG. 1B, except that it extends to, and is fixed to, support bar 44. The transfer sheet 120 carries the parcels 14 between the feed and exit conveyor belts, 40 and 50 respectively.

Figure 2B:
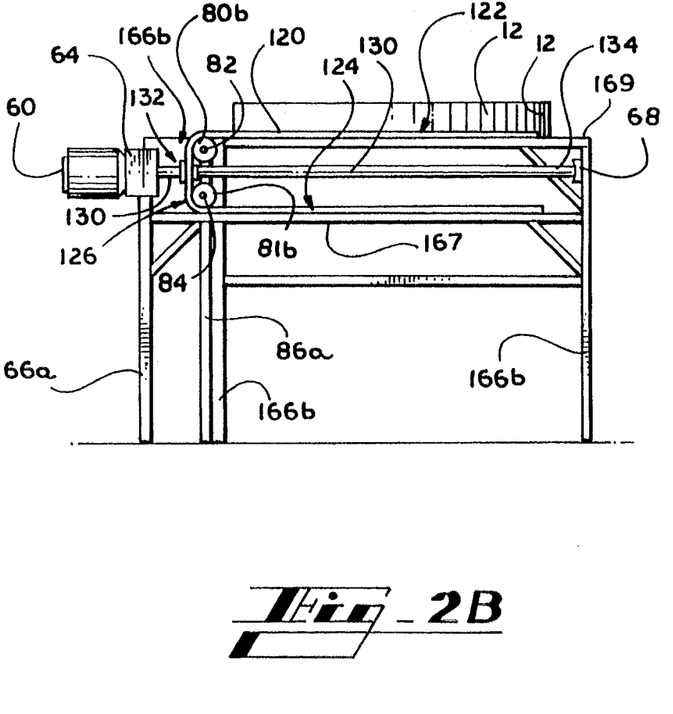
FIG. 2B is a cross-sectional side view taken along line 2B—2B of FIG. 2A.

A shaft 130 is attached to the transfer sheet 120 in a manner similar to the shaft 30 in FIG. 1C, but is oriented horizontally, as can be seen in FIG. 2B. FIG. 2B is a cross-sectional side view of FIG. 2A taken along line 2B—2B, but the exit conveyor belt 50 is not shown in FIG. 2B. The motor 60 is mounted on a support frame 166a. A speed control and reducer mechanism 64 translates and controls the output of the motor 60 that causes rotation of shaft 130. The speed control mechanism 64 is familiar to those skilled in the art.

The transfer sheet 120 is disk-shaped and identical to sheet 20, but is folded in half in this alternative embodiment. The folded transfer sheet 120 has two horizontal segments, 122 and 124, of equal size, that are separated by a vertical central section 126. The lower segment 124 of transfer sheet 120 rests on a support plate 167 (FIGS. 2A and B). The upper segment 122 of transfer sheet 20 rests on a support plate 169. The support plates 167 and 169 are semicircular in shape to support the upper and lower horizontal segments, 122 and 124, respectively, of the transfer sheet 120. The support plates 167 and 169 are rigid metal sheets coated with a low friction material such as Teflon® in the preferred embodiment, although they could be manufactured of different materials. In an alternative embodiment, the support plates 167 and 169 have rollers or casters mounted thereon, such as are shown herein in FIG. 1C, to facilitate movement of the transfer sheet 120.

The support plate 167 is supported between the support frame 166a and a second support frame 166b (FIG. 2B). The support frame 166a extends under and supports the linear edge of the support plate 167 and the motor 60. The semi-circular support frame 166b extends around the outer circumference of the support plate 167 and connects to the frame 166a via the support plate 167. Thus, the support plate 167 extends between and is supported by the support flames 166a and b.

The support plate 169 extends inwardly from the support frame 166b to support the entire upper segment 124 of the transfer sheet 120. Those skilled in the art will recognize that the position and structure of support flames 166a and b may be modified.

The shaft 130 extends through and is bolted to the center of transfer sheet 120. One end 132 of the shaft 130 extends from the speed control and reducer 64 through the transfer sheet 120. The second end 134 of the shaft 130 rotatably rests in a bearing 68 attached to the support frame 166b.

Two pairs of rollers, 80a and b are positioned to facilitate movement of the transfer sheet 120. Rollers 80a and b are positioned in spaced apart relation at the intersection of the upper segment of the transfer sheet 122, with the central section 126 of the transfer sheet 120 (FIG. 2B). Thus, the rollers 80a and b are positioned under the upper segment 122 of the transfer sheet 120. A further pair of rollers 81a and b are spaced apart from and positioned parallel to rollers 80a and b at the intersection of the central section 126 and lower segment 124 of the transfer sheet 120. Thus, the rollers 81a and b are positioned above the lower segment 124 of the transfer sheet 120.

As is best seen in FIG. 2A, the rollers 80a and b rotate around an axle 82. The roller 81a is not shown, but is positioned directly below roller 80a. Rollers 81a and b rotate around an axle 84 (FIG. 2B). The rollers 80a and 81a rotate clockwise when viewed from the orientation of FIG. 2B to facilitate movement of the transfer sheet 120 from the lower support plate 167 to the upper support plate 169. In contrast, the rollers 80b and 81b rotate counterclockwise when viewed from the orientation of FIG. 2B to facilitate movement of the transfer sheet 120 from the upper support plate 169 to the lower support plate 167. The ends of the axles 82 and 84 are supported by a pair of members 86a and b that extend upward to the axles 82 and 84 from the ground (FIG. 2B). The members 86a and b may be rigidly affixed to the support frames 166a and/or b.

The transfer sheet 120 rotates in unison with the shaft 130. The rollers 80a and 81a and b facilitate movement of the transfer sheet 120 between the upper support plate 169 and the lower support plate 167. The rotation of the transfer sheet 20 across the upper support plate 169 moves the parcels 14 from the feed conveyor belt 40 to the exit conveyor belt 50.

Figure 3A:
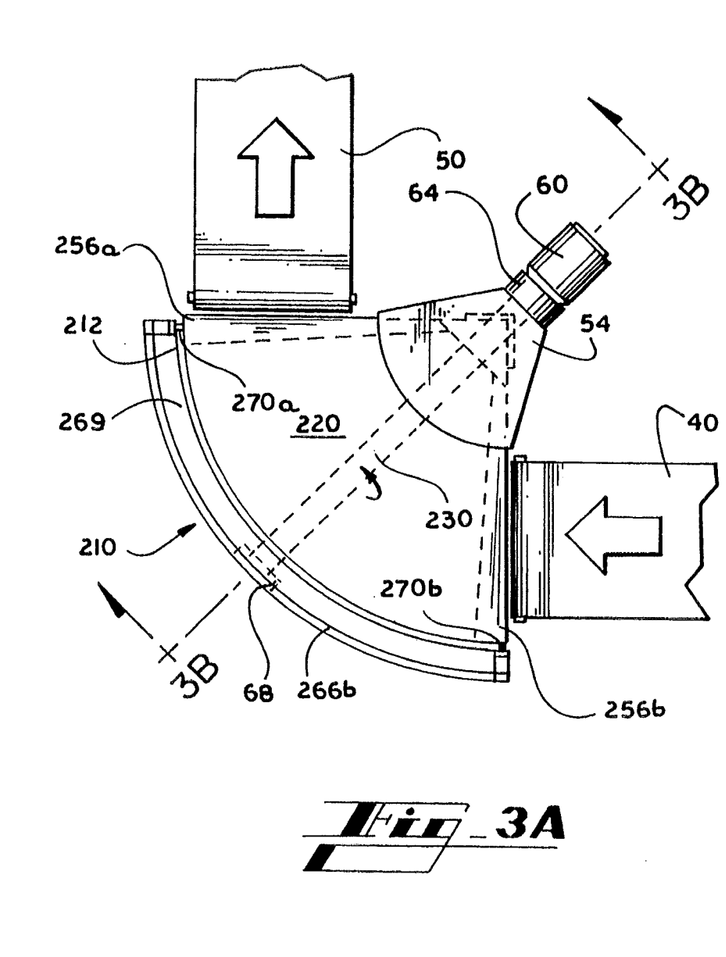
FIG. 3A is a top view of another alternative embodiment of the powered belt turn of the present invention.

FIG. 3A is a top view of a second alternative embodiment of a powered belt turn 210 of the present invention. The powered belt turn 210 forms a ninety degree (90°) turn between the feed conveyor belt 40 and the exit conveyor belt 50 in FIG. 3A.

Figure 3B:
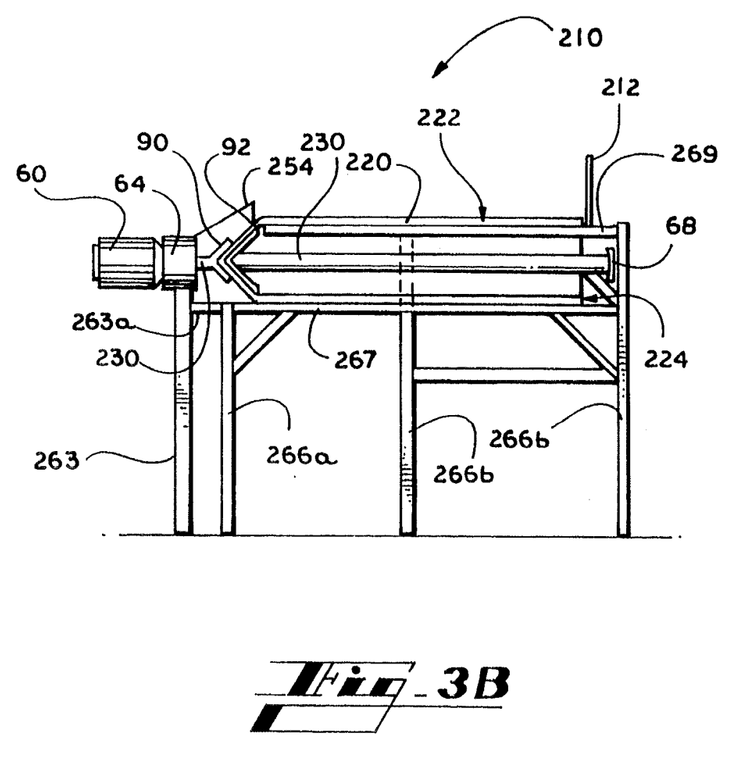
FIG. 3B is a cross-sectional side view taken along line 3B—3B of FIG. 3A.

Referring now to FIG. 3B, which is a cross-sectional side view taken along 3B—3B of FIG. 3A, a transfer sheet 220 is conically-shaped, and flattened as shown in FIG. 3B. A lower segment 222 of the transfer sheet 220 rests on a support plate 267. The lower support plate 267 is wedge-shaped or triangular and extends from a support frame 266a outwardly to an arcuate support frame 266b. The support frame 266b extends around the outer arcuate circumference of the transfer sheet 220.

An upper segment 224 of the transfer sheet 220 rests on a wedge-shaped support plate 269. The support plate 269 extends inwardly from and is supported by the support frame 266b. The support frame 266b extends under the upper segment 224 of the transfer sheet 220 from the edges of the outer circumference of the transfer sheet 220. The support plates 267 and 269 may have rollers or casters positioned thereon, such as are seen above in FIG. 1 C, to facilitate movement of the transfer sheet 220. Those skilled in the art will recognize that the position and structure of the support frames 266a and b that support the plates 267 and 269 may be modified.

Those skilled in the art will recognize that the angle formed by the powered belt turn 210 between the feed conveyor belt 40 and the exit conveyor belt 50 may be changed by moving the point at which the feed conveyor belt 40 terminates. Alternatively, in this embodiment, the user may change the arcuate sweep of the belt turn 2 10 to alter the angle of delivery between the feed conveyor belt 40 and the exit conveyor belt 50, instead of adjusting the position of the feed conveyor 40. Thus, the feed and exit conveyor belts, 40 and 50, may be kept at the same relative height as the transfer sheet 220 when various angle arcuate turns are utilized. Maintaining the feed and exit conveyor belts, 40 and 50, at about the same height as sheet 220 reduces stress on the parcels 14 that occurs when the feed conveyor belt 40 is positioned above the transfer sheet 220 and parcels 14 fall from the feed conveyor belt 40 onto the transfer sheet 220.

The motor 60 and speed control and reducer 64 are mounted on a support member 263. The support member 263 is connected to support frame 266a via member 263a.

A shaft 230 is horizontally oriented, and powered by the motor 60 through the speed control and reducer 64. The end of the shaft 230 opposite the motor 60 rests in a bearing 68, which supports the shaft 230 and allows it to rotate. The end of shaft 230 nearest to the motor 60 has associated therewith a first funnel-shaped plate 90 and a second funnel-shaped plate 92. The apex of the conical transfer sheet 220 is clamped between the first and second funnel-shaped plates, 90 and 92, respectively (FIG. 3B).

One of the plates, 90 and 92, is detachably affixed to shaft 230 or to the other plate, allowing one plate to be removed so that the shaft 230 can receive replacement transfer sheets 220 when a transfer sheet 220 rips or wears out. The removable plate, 90 or 92, may be detachably affixed to the other plate or the shaft 230 with bolts (not shown) or by other means familiar to those skilled in the art.

Two tapered idler rollers 256a and 256b are positioned along the radial edges of the support plate 269. The transfer sheet 220 is mounted around and rotates with the rollers 256a and b. A pair of axles 270a and b carry the tapered rollers 256a and b, and extend inwardly from the support frame 266b. The axles 270a and b may optionally be supported at the end opposite the support frame 266b, if extra rigidity is desired. For example, a collar (not shown) could be mounted on the shaft 230 and the axles 270a and b could be connected to the collar for support. The shaft 230 would rotate within the collar, as will be familiar to those skilled in the art.

A cover 254 extends over the shaft 230 from speed control and reducer 64. The cover 254 is designed to prevent injuries to an operator of the powered belt turn 210. The cover 254 also serves to help guide parcels on the powered belt turn 210 between the feed conveyor belt 40 and the exit conveyor belt 50. Likewise, a side panel 212 is positioned on the support plate 269 around the outer circumference of the transfer sheet 220 to guide parcels on the transfer sheet 220. The side panel 212 is like side panel 12 in FIG. 1B, except that it has an arcuate shape to match powered belt turn 210.

Those skilled in the art will recognize that the present invention provides a powered belt turn that eliminates the need for a drive means between the drive shaft, 30, 130 and 230, and the transfer sheet, 20, 120 and 220. No driver rollers or gear and sprocket mechanisms are required. Furthermore, because the drive shaft is affixed directly to the transfer sheet, no guide means for keeping the transfer sheet in position with respect to the rollers is required. These features of the powered belt turn, 10, 110 and 210, of the present invention permit operation at very high speeds.

In view of the foregoing description of the preferred embodiment in its intended environment, other embodiments of the present invention will suggest themselves to those skilled in the art. Therefore, the scope of the present invention is to be limited only by the claims below and equivalents thereof.

We claim:

1. In a conveyor system, including a feed conveyor and an exit conveyor, a powered belt turn comprising:
   a disk-shaped, semi rigid transfer sheet supported for rotation along a path of movement;
   a bed defining a horizontal surface for supporting said transfer sheet along a first segment of said path of movement, said bed comprising a bed edge over which said transfer sheet is bent downwardly such that said transfer sheet travels in a second segment of said path of movement of said transfer sheet, and wherein said exit conveyor is positioned adjacent said bed edge; and
   a driven, rotatable shaft affixed to said transfer sheet and extending therefrom substantially perpendicular to said second segment of said path of movement of said transfer sheet, whereby said transfer sheet rotates over said bed in correspondence with the rotation of said shaft, and wherein said transfer sheet is positioned to receive objects from said feed conveyor and rotates in conjunction with said shaft to transfer said objects to said exit conveyor.

2. The powered belt turn of claim 1 including a power source connected to said shaft for rotating said shaft.

3. The powered belt turn of claim 1 wherein an end of said shaft is affixed to the center of said transfer sheet.

4. The powered belt turn of claim 3 wherein the shaft is bolted to said transfer sheet.

5. The powered belt turn of claim 3 wherein said shaft is horizontally oriented.

6. The powered belt turn of claim 1 wherein said bed further includes a plurality of casters, said transfer sheet being cantilevered over said casters, and said casters rotating to facilitate movement of said transfer sheet over said bed.

7. In a conveyor system, including a feed conveyor and an exit conveyor, a powered belt turn comprising:
   a disk-shaped, semi-rigid transfer sheet supported for rotation along a path of movement;
   a first bed defining a horizontal surface for supporting said transfer sheet along a first segment of said path of movement, said bed comprising a bed edge over which said transfer sheet is bent downwardly such that said transfer sheet travels in a second segment of said path of movement of said transfer sheet;
   a horizontally oriented, driven, rotatable shaft affixed to said transfer sheet and extending therefrom substantially perpendicular to said second segment of said path of movement of said transfer sheet; and
   a second bed defining a horizontal surface for supporting said transfer sheet along a third segment of said path of movement, said second bed positioned beneath said first bed, said transfer sheet being positioned such that a portion of said transfer sheet traveling in said second segment of said path of movement of said transfer sheet is vertically aligned between said first and second beds, wherein said transfer sheet is positioned to receive objects from said feed conveyor onto said transfer sheet supported by said first bed and rotated in conjunction with said shaft to transfer said objects to said exit conveyor.

8. The apparatus of claim 1 wherein said bed is a first bed and further including a second bed defining a horizontal surface for supporting said transfer sheet along a third segment of said path of movement of said transfer sheet, said second bed being positioned beneath said first bed and said transfer sheet being positioned such that a portion of said transfer sheet traveling along said second segment of said path of movement of said transfer sheet is vertically aligned between said first and second bed, and wherein said portion of said transfer sheet supported by said first bed along said first path of movement of said transfer sheet is positioned to receive objects from said feed conveyor and rotate in conjunction with said shaft to transfer said objects to said exit conveyor.

9. In a conveyor system, including a feed conveyor and an exit conveyor, a powered belt turn comprising:

a disk-shaped, semi-rigid transfer sheet;

rotating means for rotating said transfer sheet to move at least a portion of said transfer sheet through:

a first path segment defined by a bed underlying said portion of said transfer sheet, and a second path segment bending downwardly from the first path segment;

said rotating means comprising a driven shaft attached to said transfer sheet and extending therefrom substantially perpendicular to said second path segment of said transfer sheet.

* * * * *